(12) United States Patent
Bissett (10) Patent No.: US 6,374,713 B1
(45) Date of Patent: Apr. 23, 2002

(54) FACEDRIVER WITH FULLY-ADAPTABLE WORKPIECE ENGAGEMENT AND ENHANCED CENTERPOINT FORCE

(76) Inventor: Kevin J. Bissett, 1773 Milldrum St., Union Grove, WI (US) 53182

( * ) Notice: Subject to any disclaimer, the term of this patent is extended or adjusted under 35 U.S.C. 154(b) by 0 days.

(21) Appl. No.: 09/546,882

(22) Filed: Apr. 10, 2000

(51) Int. Cl.[7] .......................... B23B 23/00; B23B 25/00
(52) U.S. Cl. ........................ 82/150; 82/162; 82/164; 82/165
(58) Field of Search .................... 82/150, 162, 163, 82/164, 165, 166, 167, 170

(56) References Cited

U.S. PATENT DOCUMENTS

| | | | | |
|---|---|---|---|---|
| 2,897,708 A | * | 8/1959 | Kostyrka | 82/150 |
| 2,948,540 A | * | 8/1960 | Garberding | 279/412 |
| 3,143,907 A | * | 8/1964 | Ulrich | 82/165 |
| 3,266,349 A | * | 8/1966 | Lane | 82/165 |
| 4,125,042 A | * | 11/1978 | Barron | 82/165 |
| 4,677,885 A | * | 7/1987 | Schmid et al. | 82/165 |
| 5,527,400 A | * | 6/1996 | Smith et al. | 148/537 |
| 5,771,762 A | * | 6/1998 | Bissett | 82/1.11 |

* cited by examiner

*Primary Examiner*—Henry Tsai
(74) *Attorney, Agent, or Firm*—Jansson, Shupe & Munger, Ltd (57) ABSTRACT

A facedriver for holding a workpiece along the axis of a rotary-drive machining device, including a base member, a forwardly-biased centerpoint member, drivepins supported rearwardly by fluid in a fluid-containing chamber in the base member, a grip member contacting the centerpoint member, and a grip portion of the fluid chamber adjacent to the grip member for fluid contact therewith such that varying fluid pressure caused by loading force on the drivepins causes application of varying radial gripping force on the centerpoint member through the grip member.

20 Claims, 4 Drawing Sheets

FACEDRIVER WITH FULLY-ADAPTABLE WORKPIECE ENGAGEMENT AND ENHANCED CENTERPOINT FORCE

FIELD OF THE INVENTION

The invention described herein relates generally to rotary-drive machining devices and, more particularly, to facedrivers for engaging workpieces along the axes of rotary-drive machining devices.

BACKGROUND OF THE INVENTION

Many metalworking machines employ rotary-drive devices which support and rotate the workpieces (typically shaft-like pieces) at locations permitting metalworking operations to be performed on the workpieces as they are rotated. Such metalworking machines include lathes, gear-shaping tools, hobbing tools, spline-milling tools and grinding tools. Workpieces are mounted, supported and turned in such machines along a turning axis.

One widely-used device for mounting workpieces is known as the facedriver. Facedrivers engage one end of a workpiece while the opposite end is engaged by a tailstock. The term "facedriver" is used because such device applies force to the end of the workpiece, thereby permitting metalworking operations to be performed along the entire axial length of the workpiece in a single operation. The facedriver is a preferred workpiece-mounting device for rotary-drive machining apparatus because it contacts and applies forces to only the end face of a workpiece.

Each facedriver typically includes a base member (or "driving head") with a forward end, an axially-aligned, forwardly-spring-biased centerpoint member slidably disposed in the base member, and drivepins slidably disposed in the base member around the centerpoint member and supported rearwardly by some sort of means to cause some interactive adjustment of the drivepins as they engage the workpiece. The centerpoint member is a male member with a pointed distal end for engaging a female opening at the end of the workpiece, and serves the purpose of providing axial support for the workpiece throughout the machining operations. The drivepins have distal ends engaging the workpiece and imparting to the workpiece the turning motion of the facedriver as it rotates. The drivepins are adjustably held in drivepin holes in the carrier body and are supported rearwardly (at their proximal ends) in various ways.

The two most widely used commercially-available facedrivers have two principal types of structures for rearward support of drivepins. One involves the pins bearing on a wobble ring and the other involves the pins bearing on a hydraulic fluid—an oil reservoir. These rearward support means permit the drivepins to adjust in different ways to irregular face variations of the workpiece end—such as end surfaces which are off-normal (i.e., non-perpendicular) with respect to the axis of the workpiece or concave, or which have various other irregular or erroneous configurations. Each of the two principal types of face-driver structures, however, has significant disadvantages and/or shortcomings.

In facedrivers with wobble rings, the wobble ring is able to move so that axial movement of one or two of the drivepins in one direction on one side of the centerpoint member causes compensating opposite axial movement of some of the drivepins on the opposite side of the centerpoint member. However, because of the rigid connections, less than all of the drivepins (e.g., only three of the drivepins) will make fully-solid contact with the workpiece at any one time unless there is an absolute true perpendicular mounting.

While this type of facedriver has imperfect workpiece engagement by the drivepins, it does provide relatively good workpiece engagement by the centerpoint member. More specifically, an advantage of wobble-ring structures is that rearward movement of the wobble ring caused by drivepins applies rearward force on a cone or a sleeve which in turn causes collapse of a collet, thereby gripping the centerpoint member and enhancing the axial force with which it engages the workpiece. This action gives stronger workpiece support for better on-axis stability when trans-axial tool pressure is applied on the workpiece in various metal-working operations. That is, the workpiece is supported fairly well against side-to-side shifting. As indicated, however, the problem of facedrivers with wobble-ring support for their drivepins is a lack of solid engagement of all drivepins with the workpieces—because of irregular or imperfect workpiece ends as described above.

Different advantages and disadvantages exist for facedrivers of the type in which the drivepins are supported on an oil reservoir. Given the non-compressibility of oil, the oil serves to provide compensation for each of the pins and gives you a true equalizing adjustment. The drivepins are supported on a single reservoir the shape of which accommodates the drivepin array. This hydraulic support tends to provide excellent workpiece engagement for all of the drivepins, regardless of the irregularities or imperfections of workpiece ends. All pins engage varying workpieces with equal pressure, regardless of the axial positions of any of the pins, because they are suspended on a common reservoir.

However, a significant disadvantage and shortcoming of such oil-reservoir facedrivers is that the drivepins are required to serve too much of a role in holding workpieces in proper axial alignment. While it is supposed to be the role of the centerpoint member to insure proper axial alignment during operations, when the workpiece is loaded against the drivepins (against the resistance of the tail stock engaging the other end of the workpiece), the force with which the drivepins engage the workpiece exceeds the force by which the centerpoint member engages the workpiece.

The result is that there is a tendency for the centerpoint member to float because the only thing that helps it apply force to the workpiece is a spring behind it. The problem is that because the spring pressure does not equal the hydraulic pressure, the drivepins end up both driving and more or less suspending the workpiece. This is potentially problematic, particularly when substantial radial loads are applied to the workpiece during machining operations.

In summary, there is a need for an improved facedriver which overcomes each of the differing problems in prior art devices.

OBJECTS OF THE INVENTION

It is an object of this invention to provide a facedriver overcoming the problems and shortcomings of the prior art, including those noted above.

Another object of this invention is to provide an improved facedriver which exhibits even and consistent engagement of the drivepins with the workpiece, without any sacrifice in the workpiece-centering and workpiece-holding functions of the centerpoint member.

Another object is to provide an improved facedriver which provides enhanced workpiece-engagement under increased loading conditions without any sacrifice in the ability of drivepins to conform to the workpiece-end irregularities.

Still another object of the invention is to provide an improved facedriver with balanced drivepin engagement with workpiece ends despite workpiece-end variations and commensurately enhanced centerpoint member loading force as drivepin forces increase.

It is a further object of this invention to provide an improved facedriver with excellent workpiece engagement and holding properties and simple construction and operation.

These and other objects of the invention will be apparent from the following descriptions and from the drawings.

SUMMARY OF THE INVENTION

This invention is an improved facedriver which overcomes significant problems in the industry, including those described above. The facedriver of this invention is an improvement in facedrivers of the type including a base member with a forward end, an axially-aligned, forwardly-biased centerpoint member slidably disposed in the base member, and drivepins slidably disposed in the base member around the centerpoint member and supported rearwardly by hydraulic fluid in drivepin portions of a fluid-containing chamber within the base member.

The facedriver of this invention includes a grip member within the base member and contacting the lateral surface of the centerpoint member to apply radial gripping force thereon to enhance the axial loading force applied by centerpoint member to the workpiece under certain conditions. The fluid chamber, in addition to its drivepin portions, includes a grip portion adjacent to the grip member for fluid contact therewith. Thus, loading forces applied through the drivepins are transmitted to the grip portion of the fluid chamber, so that such fluid pressure results in application of radial force on the lateral surface of the centerpoint member through the grip member.

The grip portion of the fluid chamber and the grip member are configured and arranged such that varying hydraulic fluid pressure in the fluid chamber, caused by forces transmitted to the fluid by the drivepins, result in varying loading forces being applied by the centerpoint member on the workpiece. More specifically, the grip member, the drivepins, and the grip portion and drivepin portions of the fluid chamber are configured and arranged, and the biasing of the centerpoint member selected, such that the force of the drivepins applied to the workpiece upon facedriver loading and the resulting increased fluid pressure in the fluid chamber serve to cause the centerpoint member to apply force to the workpiece upon facedriver loading which approaches the force applied by the drivepins.

In highly preferred embodiments of this invention, the grip member, at the grip portion of the fluid chamber, has a radially-compressible portion bearing on the lateral surface of the centerpoint member. The radially-compressible portion is preferably in the form of a sleeve, and such sleeve is preferably of metal. It is most preferred that the radially-compressible sleeve be integrally formed with the remainder of the grip member. It is highly preferred that the grip member be sleeved over the centerpoint member and that the grip portion of the fluid chamber be formed in part by an annular void along the radially-compressible portion of the grip member.

In such embodiments, it is highly preferred that the fluid chamber includes at least one connecting portion extending from the annular void to the drivepin portions of the fluid chamber. Such connecting portion preferably extends rearwardly along the grip member from the annular void to the drivepin portions of the fluid chamber.

Preferred embodiments are now described in more detail. The base member of the facedriver of this invention preferably forms various voids and spaces in it for the movable components and to accommodate the functions involving hydraulic fluid. More specifically, the base member forms a center void along the axis, drivepin voids around the axis, and a fluid chamber around the axis which includes a grip portion and drivepin portions adjacent to the drivepin voids. The forwardly-biased centerpoint member has a lateral surface and extends axially along the center void within the base member to a centerpoint-member distal end beyond the forward end of the base member. The drivepins are in the drivepin voids and extend forwardly to drivepin distal ends and rearwardly to drivepin proximal ends which are adjacent to the drivepin portions of the fluid chamber for support on the hydraulic fluid. The grip member in the center void has an inner surface against which the centerpoint member is slidably engaged and an outer surface with a mid-portion adjacent to the grip portion of the fluid chamber for fluid contact. As already noted, the grip portion of the fluid chamber and the grip member are configured and arranged such that varying hydraulic pressure in the fluid chamber applies varying radial gripping force on the centerpoint member through the grip member.

In certain preferred embodiments, the center void in the base member includes a forward portion with a cylindrical wall of first diameter, a middle portion with a cylindrical wall of second diameter greater than the first diameter, an a rearward portion with a cylindrical wall of third diameter greater than the second diameter. That portion of the grip-member outer surface which is forward of the radially-compressible portion of the grip member engages the cylindrical wall of first diameter, and one or more connecting portions of the fluid chamber are along the cylindrical wall of second diameter.

The grip member preferably includes a forward cylindrical bore defined by the grip-member inner surface and a rearward axial recess abutting the cylindrical bore. In such preferred embodiments, the rearward axial recess receives a spring, typically a coil spring, which bears on the centerpoint member to provide its forward bias. In such preferred embodiments, the spring is selected such that its axial force, along with the resistance forces in the centerpoint member generated hydraulically due to the particular configuration and arrangement of parts causes the centerpoint member to apply force to a workpiece which approaches the force applied by the drivepins.

In a broad form, this invention is an apparatus for applying force on an object which includes: a base member with a forward end; a forwardly-biased first slidable member slidably disposed in the base member along an axis; one or more additional slidable members each of which is slidably disposed in the base member in a generally axially-parallel position and supported rearwardly by hydraulic fluid in a chamber within the base member; a grip member within the base member and contacting the first slidable member; and a grip portion of the fluid chamber, such grip portion being adjacent to the grip member for fluid contact therewith such that varying fluid pressure in the fluid chamber applies varying gripping force (e.g., radial gripping force) on the first sidable member through the grip member.

BRIEF DESCRIPTION OF THE DRAWINGS

The drawings illustrate a preferred embodiment which includes the above-noted characteristics and features of the invention. The invention will be readily understood from the descriptions and drawings. In the drawings.

DETAILED DESCRIPTION OF PREFERRED EMBODIMENTS

Figure 1:
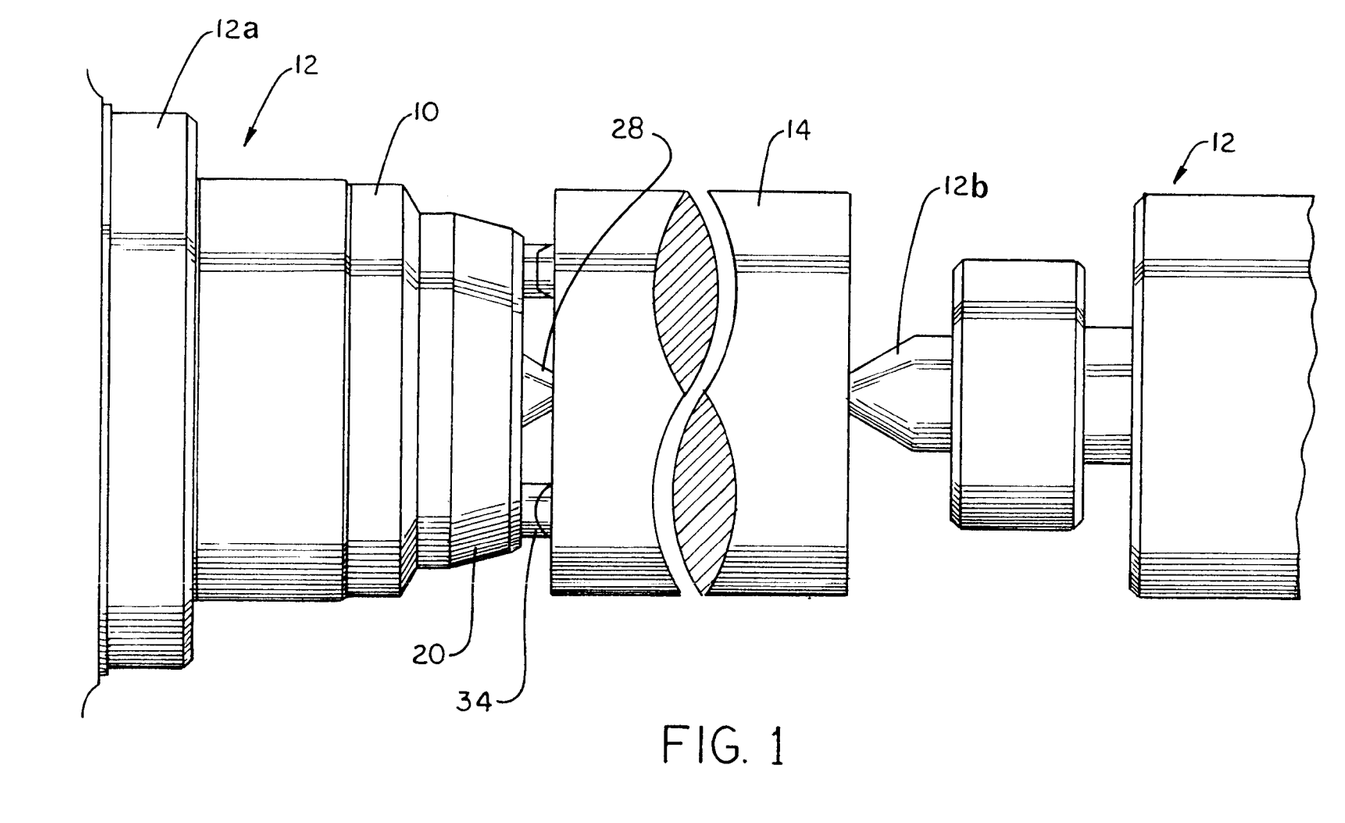
FIG. 1 is a fragmentary side elevation of a rotary-drive machining device including a facedriver in accordance with a preferred embodiment of this invention in position engaging a workpiece.

FIG. 1 illustrates a facedriver 10 in accordance with this invention on a lathe 12, which includes a main portion 12a and a tailstock portion 12b. Facedriver 10 may be coupled to lathe 12 in various ways. Most preferably, facedriver 10 is quickly and easily coupled to lathe 12 (or to another rotary-drive machining device) by use of the quick-coupling assembly described and claimed in U.S. Pat. No. 5,771,762 (Bissett). An elongate workpiece 14 is mounted between facedriver 10 and tailstock portion 12b, along an axis 16 defined by lathe 12. Facedriver 10, of course, serves the normal purposes of mounting workpiece 14 and transmitting the turning force of lathe 12 to workpiece 14. The details of facedriver 10 are illustrated in FIGS. 2–5C.

Facedriver 10 includes a main body or base member 20 formed of two principal parts bolted together, a front member 20a and a rear member 20b, and has a forward end 20c and a rear end 20d. The remaining other parts of facedriver 10 are secured to or mounting in base member 20 in various ways. Base member 20 has various voids and spaces formed in it to accommodate the other parts. These voids and spaces include a center void 22 which is centered about axis 16, eight drivepin voids 24 which are radially spaced from center void 22 and arranged around axis 16, and a fluid chamber 26 which is around axis 16 and designed to accommodate the functions described herein.

Figure 2:
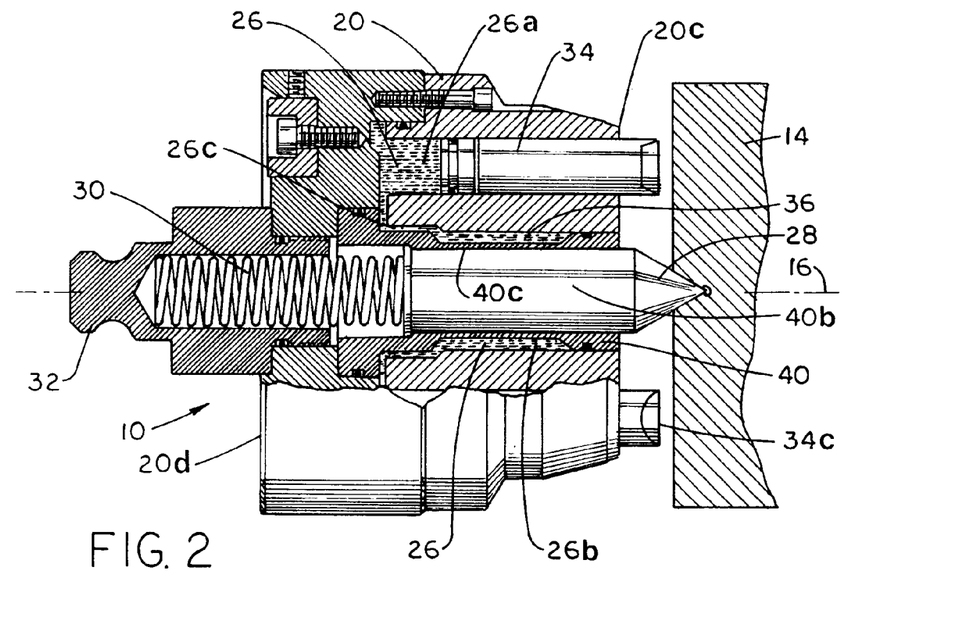
FIG. 2 is a side elevation with breakaway portions, illustrating the facedriver as it begins to come into engagement with a workpiece during workpiece mounting.
Figure 3:
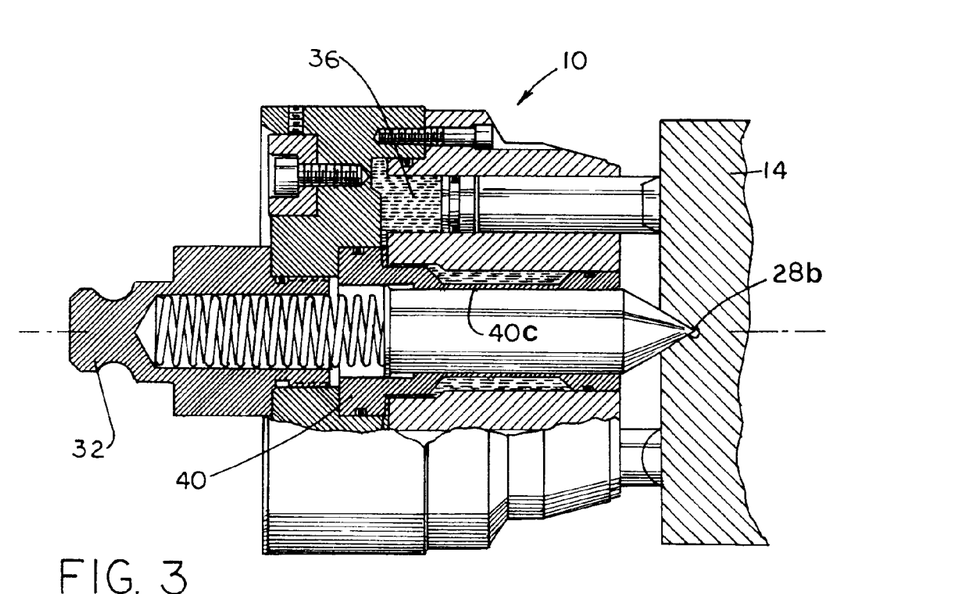
FIG. 3 is a side elevation as in FIGURE w, but illustrating the facedriver in complete engagement with a workpiece.
Figure 4:
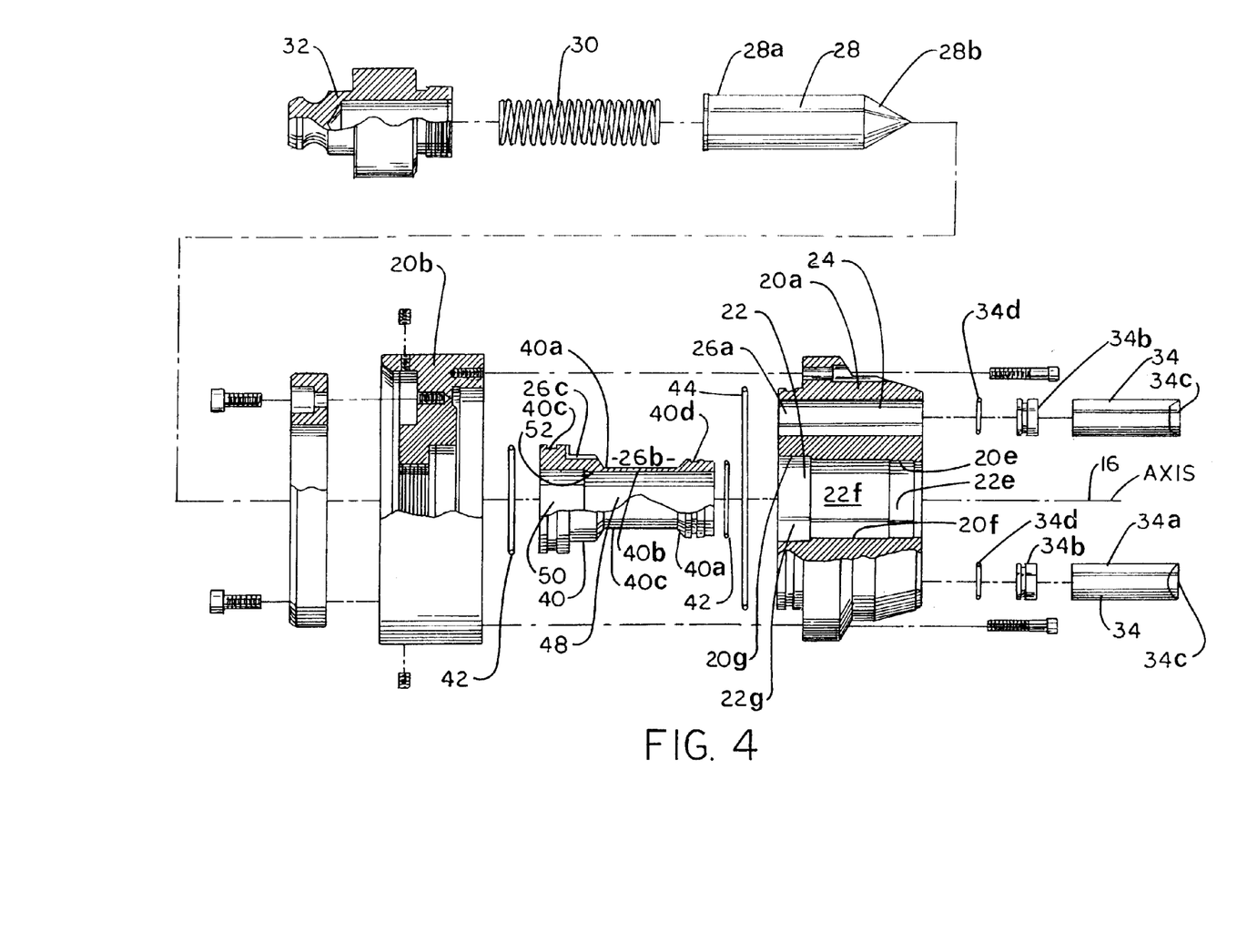
FIG. 4 is an exploded side elevation of the facedriver with breakaway portions and portions in section.

Facedriver 10 also includes an axially-aligned, forwardly-biased centerpoint member 28 which extends axially along center void 22. Centerpoint member 28 has a lateral surface 28a and terminates forwardly in a pointed distal end 28b which engages workpieces such as workpiece 14. Centerpoint member 28 is slidably disposed in base member 20 and is forwardly biased by a coil spring 30 which extends in known fashion between a retention knob member 32 and the back end of centerpoint member 28.

Facedriver 10 further includes drivepins 34 slidably disposed in drivepin voids 24 in base member 20. Each drivepin 34 includes a drivepin main portion 34a and a separate drivepin piston portion 34b. Drivepin main portion 34a terminates forwardly in a drivepin distal end 34c, which serves to engage and turn workpiece 14, and at its rear end abuts drivepin piston portion 34b. Each drivepin piston portion 34b, at its back end, is in contact with hydraulic fluid 36 in fluid chamber 26. Each drivepin 34 also includes an O-ring 34d around piston portion 34b for fluid-sealing engagement with the wall of its corresponding drivepin void 24.

Facedriver 10 includes a sleeve-like annular grip member 40 around centerpoint member 28 in center void 22. Grip member 40 has an outer surface 40a and an inner surface 40b. Inner surface 40b is in annular engagement with lateral surface 28a of centerpoint member 28; thus, the slidable relationship of centerpoint member 28 to base member 20 is by slidable engagement with grip member 40. Grip member 40, which is in fixed axial position with respect to base member 20 by its engagement thereto, has a radially-compressible thin-walled mid-portion 40c which bears on lateral surface 28a of centerpoint member 28. Mid-portion 40c, like all of grip member 40, is in the form of a sleeve and is integrally formed with all of grip member 40. Grip member 40 is metal.

Fluid chamber 26, in addition to having drivepin portions 26a behind drivepins 34, has an annular portion ("grip portion") 26b which is adjacent to and defined in part by mid-portion 40c of grip member 40. Outer surface 40a of grip member 40, at midportion 40c, is in a necked-in configuration to form annular portion 26b of fluid chamber 26. Thus, fluid chamber 26 is designed to apply the force of its hydraulic fluid pressure on the outer surface of radially-compressible thin-walled mid-portion 40c; hydraulic fluid 36 in annular portion 26b of fluid chamber 26 engages and applies radially-inward force on mid-portion 40c.

The wall thickness of thin-walled mid-portion 40c can vary depending upon the choice of materials and other parameters of the system, including the diameter of grip member 40, the length of mid-portion 40c, and the size of the overall equipment, to name just some. In the embodiment illustrated, the outside diameter of mid-portion 40c is 1.125 inch, and the length of mid-portion 40c is 1.25 inch. Wall thickness of the embodiment illustrated, in which grip member 40 is made of high-carbon steel such as 4140 steel, is 0.040 inch. A suitable thickness range for such material is about 0.030–0.080 inch. Variations in materials will dictate a variation in suitable thickness ranges.

With the inventive device, varying loading forces (i.e., forces on facedriver 10) applied through drivepins 34 are transmitted to annular portion 26b of fluid chamber 26, and result in application of radial force on lateral surface 28a of centerpoint member 28 through grip member 40. As explained above, this allows centerpoint member 28 to increase its axial force on workpiece 14, which allows centerpoint member 28 to better serve its holding/centering function even when substantial axial forces are applied to workpiece 14 during machining operations.

The dimensioning of mid-portion 40c is chosen to meet the particular machining operation. The illustrated embodiment, in which the mid-portion is 1.25 inch in length, is appropriate for grinding and hobbing applications, both of which involve substantial radial metal-working loads on workpiece 14. Increasing the length of mid-portion 40c increases the enhancement of axial loading force of centerpoint member 28 on workpiece 14; decreasing the length of mid-portion 40c decreases the enhancement of axial loading force of centerpoint member 28 on workpiece 14. Lathe metal-working applications such as chip removal of workpiece 14 typically involve substantially less radial metal-working loads and typically involves some axial metal-working loads. Under such circumstances, mid-portion 40c could be of shorter length, because that is sufficient to provide the less amount of force enhancement needed.

Acceptable variations in dimensioning will be apparent to those skilled in the art who are made familiar with this invention.

Figure 5A:
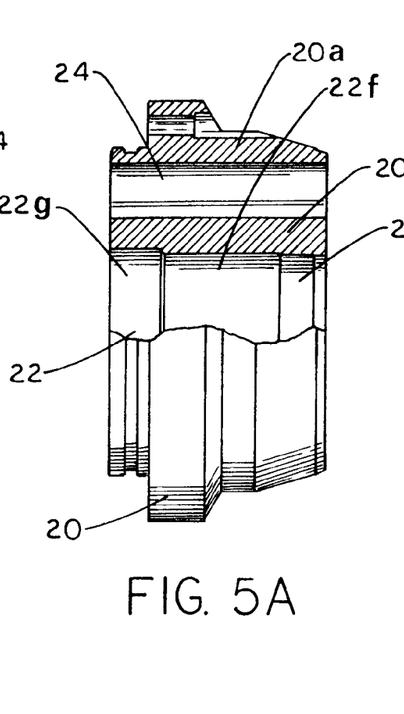
FIG. 5A is an enlarged side elevation of the facedriver body (or "base member") with breakaway portions.
Figure 5B:
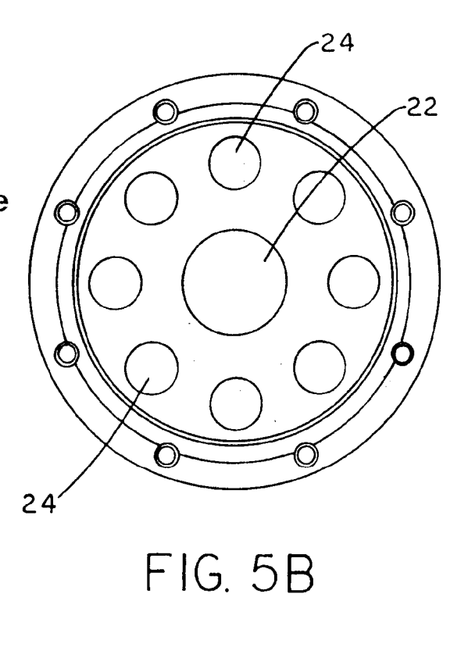
FIG. 5B is a right side elevation of FIG. 5A.
Figure 5C:
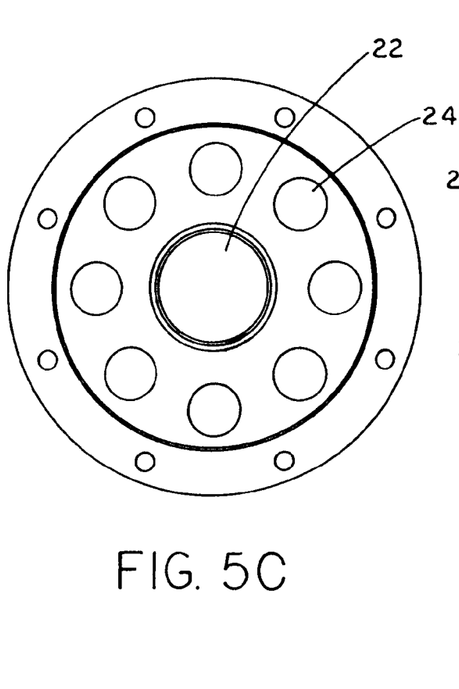
FIG. 5C is a left side elevation of FIG. 5A.

The relationship of grip member 40 to base member 20 is better described with further reference to further details of base member 20. Center void 22 in base member 20 has: a forward portion 22e formed by a forward cylindrical wall 20e of first diameter; a middle portion 22f formed by a middle cylindrical wall 20f of second diameter, which is greater than the first diameter; and a rearward portion 22e formed by rearward cylindrical wall 20g of third diameter, which is greater than the second diameter. Grip member 40 has a forward portion 40d which is forward of mid-portion 40c and sealingly engages forward cylindrical wall 20e. Grip member 40 also has a rearward portion 40e which is rearward of mid-portion 40c and sealingly engages rearward cylindrical wall 20g. Such sealing engagement is facilitated by O-rings 42, so that hydraulic fluid 36 is properly contained.

The front and rear ends of grip member 40 are engaged with front member 20a and rear member 20b, respectively, of base member 20. Front member 20a and rear member 20b of base member 20 are in sealing engagement with one another by means of large O-ring 44.

Along the length of grip member 40 are end-to-end axial bores of two different diameters, including a forward cylindrical bore 48, which is defined by inner surface 40b and extends along most of the length of grip member 40, and a rearward cylindrical bore 50. Rearward cylindrical bore 50 receives coil spring 30, which bears on centerpoint member 28 to provide the forward bias of centerpoint member 28. The ledge 52 between forward and rearward cylindrical bores 48 and 50 provides a stop for centerpoint member 28, defining its forwardmost (unengaged) position.

Fluid chamber 26, in addition to its eight drivepin portions 26a and annular portion 26b, includes various generally radially-oriented connecting portions 26c such that, despite its irregular shape, fluid chamber 26 is a single chamber and can perform the plural hydraulic functions of this invention. Connecting portions 26c of fluid chamber 26 are along middle cylindrical wall 20f at and near the rear portion thereof, and extend rearwardly and radially outwardly from annular portion 26b of fluid chamber 26 to join drivepin portions 26a of fluid chamber 26.

Facedriver 10 can be made using metals of the type commonly used in facedrivers and other rotary-drive apparatus. A variety of material choices and alternative materials, including non-metals, may be used depending on the particular requirements and needs. A great number of variations are possible in the facedriver shown in the drawings. The shape of the fluid chamber, including the number and location of connecting portions, can vary greatly. Likewise, the specific applications for this invention for holding and turning devices are not limited.

Among other things, the form of the apparatus for applying hydraulic gripping forces onto a centerpoint member can vary greatly. It is not essential that the grip member be an annular sleeve-like device, nor is it necessary that radial forces be applied evenly all around the centerpoint member. A great number of variations are possible.

While the principles of this invention have been described in connection with specific embodiments, it should be understood clearly that these descriptions are made only by way of example and are not intended to limit the scope of the invention.

I claim:

1. A facedriver for holding a workpiece along the axis of a rotary-drive machining device, comprising:
    a base member with a forward end and forming therein:
        a center void along the axis,
        drivepin voids around the axis, and
        a fluid-containing fluid chamber around the axis and including a grip portion and drivepin portions adjacent to the drivepin voids;
    a forwardly-biased centerpoint member having a lateral surface and extending axially along the center void to a centerpoint-member distal end beyond the forward end of the base member;
    drivepins in the drivepin voids extending forwardly to drivepin distal ends and rearwardly to drivepin proximal ends adjacent to the drivepin portions of the fluid chamber for fluid support; and
    a grip member in the center void having a substantially axially-fixed inner surface against which the centerpoint member is slidably engaged and an outer surface with a mid-portion adjacent to the grip portion of the fluid chamber for fluid contact therewith, the grip portion of the fluid chamber and the grip member being configured and arranged such that the grip member is between the fluid and the centerpoint member and varying fluid pressure in the fluid chamber applies varying radial gripping force on the centerpoint member through the grip member.

2. The facedriver of claim 1 wherein the grip member, the drivepins, and the grip portion and drivepin portions of the fluid chamber are configured and arranged, and the biasing of the centerpoint member selected, such that the force of the drivepins applied to the workpiece upon facedriver loading and the resulting increased fluid pressure in the fluid chamber serve to cause the centerpoint member to apply force to the workpiece upon facedriver loading which approaches the force applied by the drivepins.

3. The facedriver of claim 1 wherein the fluid chamber has at least one connecting portion extending from the grip portion to the drivepin portions of the fluid chamber.

4. The facedriver of claim 1 wherein the grip member, at the grip portion of the fluid chamber, has a radially-compressible portion bearing on the lateral surface of the centerpoint member.

5. A facedriver for holding a workpiece along the axis of a rotary-drive machining device, comprising:
    a base member with a forward end and forming therein:
        a center void along the axis,
        drivepin voids around the axis, and
        a fluid-containing fluid chamber around the axis and including a grip portion and drivepin portions adjacent to the drivepin voids;
    a forwardly-biased centerpoint member having a lateral surface and extending axially along the center void to a centerpoint-member distal end beyond the forward end of the base member;
    drivepins in the drivepin voids extending forwardly to drivepin distal ends and rearwardly to drivepin proximal ends adjacent to the drivepin portions of the fluid chamber for fluid support; and
    a grip member in the center void having an inner surface against which the centerpoint member is slidably engaged and an outer surface with a mid-portion adjacent to the grip portion of the fluid chamber for fluid contact therewith, the grip portion of the fluid chamber and the grip member being configured and arranged such that varying fluid pressure in the fluid chamber applies varying radial gripping force on the centerpoint member through the grip member, the grip member having, at the grip portion of the fluid chamber, a radially-compressible sleeve portion bearing on the lateral surface of the centerpoint member.

6. The facedriver of claim 5 wherein the radially-compressible sleeve is of metal.

7. The facedriver of claim 6 wherein the radially-compressible sleeve is integrally formed with the remainder of the grip member.

8. A facedriver for holding a workpiece along the axis of a rotary-drive machining device, comprising:
   a base member with a forward end and forming therein:
      a center void along the axis,
      drivepin voids around the axis, and
      a fluid-containing fluid chamber around the axis and including a grip portion and drivepin portions adjacent to the drivepin voids;
   a forwardly-biased centerpoint member having a lateral surface and extending axially along the center void to a centerpoint-member distal end beyond the forward end of the base member;
   drivepins in the drivepin voids extending forwardly to drivepin distal ends and rearwardly to drivepin proximal ends adjacent to the drivepin portions of the fluid chamber for fluid support; and
   a grip member in the center void sleeved over the centerpoint member and wherein:
      the grip member has an inner surface against which the centerpoint member is slidably engaged and an outer surface with a mid-portion adjacent to the grip portion of the fluid chamber for fluid contact therewith,
      the grip portion of the fluid chamber and the grip member are configured and arranged such that varying fluid pressure in the fluid chamber applies varying radial gripping force on the centerpoint member through the grip member, the grip member having, at the grip portion of the fluid chamber, a radially-compressible portion bearing on the lateral surface of the centerpoint member; and
      the grip portion of the fluid chamber being formed in part by an annular void along the radially-compressible portion of the grip member.

9. The facedriver of claim 8 wherein the fluid chamber has at least one connecting portion extending from the annular void to the drivepin portions of the fluid chamber.

10. The facedriver of claim 9 wherein the connecting portion extends rearwardly along the grip member from the annular void to the drivepin portions of the fluid chamber.

11. The facedriver of claim 10 wherein:
   the center void in the base member includes:
      a forward portion with a cylindrical wall of first diameter,
      a middle portion with a cylindrical wall of second diameter greater than the first diameter, and
      a rearward portion with a cylindrical wall of third diameter greater than the second diameter;
   the grip-member outer surface forward of the radially-compressible portion engages the cylindrical wall of first diameter; and
   the at least one connecting portion of the fluid chamber is along the cylindrical wall of second diameter.

12. The facedriver of claim 11 wherein the grip member includes:
   a forward cylindrical bore defined by the grip-member inner surface; and
   a rearward axial recess abutting the cylindrical bore and receiving a spring which bears on the centerpoint member to provide its forward bias.

13. The facedriver of claim 12 wherein the grip member, the drivepins, the grip portion and drivepin portions of the fluid chamber, and the spring are configured, arranged and selected such that the force of the drivepins applied to the workpiece upon facedriver loading and the resulting increased fluid pressure in the fluid chamber serve to cause the centerpoint member to apply force to the workpiece upon facedriver loading which approaches the force applied by the drivepins.

14. A facedriver for holding a workpiece along the axis of a rotary-drive machining device, comprising:
   a base member with a forward end and forming therein:
      a center void along the axis,
      drivepin voids around the axis, and
      a fluid-containing fluid chamber including a grip portion and drivepin portions adjacent to the drivepin voids;
   a forwardly-biased centerpoint member having a lateral surface and extending axially along the center void to a centerpoint-member distal end beyond the forward end of the base member;
   drivepins in the drivepin voids extending forwardly to drivepin distal ends and rearwardly to the drivepin portions for fluid support; and
   a grip member having a substantially axially-fixed inner surface against which the centerpoint member is slidably engaged and an outer surface adjacent to the grip portion of the fluid chamber for fluid contact therewith, the grip portion of the fluid chamber and the grip member being configured and arranged such that the grip member is between the fluid and the centerpoint member and varying fluid pressure in the fluid chamber applies varying radial gripping force on the centerpoint member.

15. A facedriver of the type including a base member with a forward end, an axially-aligned, forwardly-biased centerpoint member with a lateral surface and slidably disposed in the base member, and drivepins slidably disposed in the base member around the centerpoint member and supported rearwardly by fluid in drivepin portions of a fluid-containing chamber within the base member, the facedriver further comprising:
   a substantially axially-fixed grip member within the base member and contacting the lateral surface of the centerpoint member; and
   a grip portion of the fluid chamber adjacent to the grip member for fluid contact therewith, the grip portion of the fluid chamber and the grip member being configured and arranged such that the grip member is between the fluid and the centerpoint member and varying fluid pressure in the fluid chamber applies varying radial gripping force on the centerpoint member through the grip member.

16. The facedriver of claim 15 wherein the grip member, the drivepins, and the grip portion and drivepin portions of the fluid chamber are configured and arranged, and the biasing of the centerpoint member selected, such that the force of the drivepins applied to the workpiece upon facedriver loading and the resulting increased fluid pressure in the fluid chamber serve to cause the centerpoint member to apply force to the workpiece upon facedriver loading which approaches the force applied by the drivepins.

17. The facedriver of claim 15 wherein the grip member, at the grip portion of the fluid chamber, has a substantially axially-fixed radially-compressible portion bearing on the lateral surface of the centerpoint member.

18. A facedriver of the type including a base member with a forward end, an axially-aligned, forwardly-biased centerpoint member with a lateral surface and slidably disposed in the base member, and drivepins slidably disposed in the base member around the centerpoint member and supported rearwardly by fluid in drivepin portions of a fluid-containing chamber within the base member, the improvement comprising:

a grip member within the base member and having a radially-compressible portion sleeved over the centerpoint member and bearing on the lateral surface thereof; and a grip portion of the fluid chamber adjacent to the grip member for fluid contact therewith, the grip portion of the fluid chamber and the grip member being configured and arranged such that varying fluid pressure in the fluid chamber applies varying radial gripping force on the centerpoint member through the grip member, the grip portion of the fluid chamber being formed in part by an annular void along the radially-compressible portion of the grip member.

19. The facedriver of claim 18 wherein the fluid chamber has at least one connecting portion extending from the annular void to the drivepin portions of the fluid chamber.

20. Apparatus for applying force on an object comprising:

a base member with a forward end;

a forwardly-biased first slidable member slidably disposed in the base member along an axis;

at least one additional slidable member which is sidably disposed in the base member in a substantially axially-parallel position and supported rearwardly by fluid in a fluid-containing chamber within the base member;

a grip member within the base member and contacting the first slidable member, the grip member having a substantially axially-fixed radially-compressible portion; and a grip portion of the fluid chamber adjacent to the radially-compressible portion of the grip member for fluid contact therewith, the grip portion of the fluid chamber and the grip member being configured and arranged such that the grip member is between the fluid and the centerpoint member and varying fluid pressure in the fluid chamber applies varying gripping force on the first slidable member through the grip member.

\* \* \* \* \*